US 6,586,905 B1

(12) United States Patent
Johnson

(10) Patent No.: US 6,586,905 B1
(45) Date of Patent: Jul. 1, 2003

(54) AUTOMATIC SENSING OF BYPASSING OF SOFT STARTER OR CONTROLLER

(75) Inventor: Lynn Stewart Johnson, Aurora, IL (US)

(73) Assignee: Siemens Energy & Automation, Alpharetta, GA (US)

( * ) Notice: Subject to any disclaimer, the term of this patent is extended or adjusted under 35 U.S.C. 154(b) by 158 days.

(21) Appl. No.: 09/604,854

(22) Filed: Jun. 28, 2000

(51) Int. Cl.[7] .............................. H02P 1/26; H02P 7/36
(52) U.S. Cl. ..................... 318/778; 318/700; 318/727; 318/779; 318/801; 318/811
(58) Field of Search ................. 318/700, 727, 318/227, 778, 779, 762, 800, 801, 811

(56) References Cited

U.S. PATENT DOCUMENTS

| | | | | |
|---|---|---|---|---|
| 4,142,136 A | * | 2/1979 | Witter | 318/779 |
| 4,459,529 A | * | 7/1984 | Johnson | 318/729 |
| 4,712,054 A | * | 12/1987 | Boldt | |
| 4,996,469 A | * | 2/1991 | Delange et al. | 318/757 |
| 5,008,608 A | * | 4/1991 | Unsworth et al. | 318/729 |

FOREIGN PATENT DOCUMENTS

| | | |
|---|---|---|
| DE | 0 446 936 A2 | 9/1991 |
| EP | 1 037372 A2 | 9/2000 |
| FR | 2 558 656 | 7/1985 |
| JP | 01 94788 | 3/1985 |

* cited by examiner

Primary Examiner—Robert E. Nappi
Assistant Examiner—Tyrone Smith

(57) ABSTRACT

A motor controller controls a motor operated by an AC line voltage. The controller includes an SCR connectable between an AC line and a motor terminal for controlling application of AC line voltage to the motor. Contacts are connected in parallel with the SCRs for selectively bypassing the SCRs. A sensing circuit senses if the contacts are bypassing the SCRs. A control is connected to the sensing circuit and the SCRs for varying relative duration of on time and off time of the SCRs during each cycle of line voltage to control motor voltage at a reference level. The control adds a time delay to a running operation prior to turning the SCRs off to stop the motor if the contacts are bypassing the SCRs.

24 Claims, 3 Drawing Sheets

AUTOMATIC SENSING OF BYPASSING OF SOFT STARTER OR CONTROLLER

FIELD OF THE INVENTION

This invention relates to motor controllers and, more particularly, to a motor soft starter that automatically senses if the starter is bypassed and adds time delay to end of a running operation to prevent arcing.

BACKGROUND OF THE INVENTION

Solid state starters/controllers have found widespread use for controlling application of power to an AC induction motor. One type of starter/controller is a reduced voltage solid state starter (RVSS). The starter/controller, referred to hereinafter as simply a controller, uses SCRs, or triacs, for controlling application of AC line voltage to the motor. The controller typically includes aluminum finned heat sinks associated with the SCRs for dissipating heat. When the controller has been running for an extended period of time, the heat sinks and SCRs become warm. Normally, the heat sinks dissipate this heat to the air surrounding the controller. A housing enclosing the controller has ventilation openings to exchange cooler air from outside with air around the controller which has been warmed. If the air is not exchanged, then the heat will build up inside the housing and damage or destroy the SCRs.

In some installations, the housing can not be ventilated due to the surrounding environment. For example, in a dairy the equipment must be washed with a high pressure hose. Cleaning solutions would be forced through the ventilation openings and damage or destroy the SCRs. In this type of application the housing must be completely sealed. The heat build up must be controlled since it cannot be vented to the outside. One known way to control this heat is to bypass the controller during its running time.

To bypass the controller, an electro mechanical contact is used in parallel with each pair of SCRs. The contacts close after the controller motor load has completed starting and is running at full speed. When the contacts close, the current stops flowing through the SCRs and starts flowing through the contacts. This is because the contacts have lower impedance than the SCRs. With the contacts carrying the current at lower impedance, the heat is virtually eliminated compared to that dissipated by the SCRs. Therefore, no ventilation is required.

At the end of the motor running operation, the motor is stopped by breaking the circuit to the motor load. The contacts are carrying the current at this time. A contact arcs when it opens with current flowing through it. This arcing exceeds the blocking capability of the parallel SCRs and can damage or destroy the SCRs. To prevent this damage, the SCRs must stay ready to conduct current as soon as the contacts open. This prevents arcing from occurring since the motor load current is still flowing. After the contacts have fully opened, so that they cannot carry current, the SCRs may be turned off. Since the SCRs turn off at zero current, there is no energy in the controller motor load and no arcing occurs to damage or destroy the triacs.

To control the turn offofthe triacs under the above-described conditions, a time delay relay is currently used. Since this delay may not be desirable for all applications, the equipment user or equipment manufacturer must remember to activate this delay when needed.

The present invention is directed to solving one or more of the problems discussed above in a novel and simple manner.

SUMMARY OF THE INVENTION

In accordance with the invention there is provided a control which automatically senses bypassing of the solid state starter control switches.

Broadly, there is disclosed herein a motor controller for a motor operated by an AC line voltage. The controller includes solid state switch means connectable between an AC line and a motor terminal for controlling application of AC line voltage to the motor. Bypass means are connected in parallel with the solid state switch means for selectively bypassing the solid state switch means. Sensing means sense if the bypass means is bypassing the solid state switch means.

It is a feature of the invention that the motor controller further includes control means connected to the sensing means and the solid state switch means for varying relative duration of on time and off time of the solid state switch means during each cycle of line voltage to control motor voltage at a reference level, the control means adding a time delay to a running operation prior to turning the solid state switch means off to stop the motor if the bypass means is bypassing the solid state switch means.

It is another feature of the invention that the switch means comprises a silicon controlled rectifier (SCR).

It is a further feature of the invention that the switch means comprises a triac.

It is yet another feature of the invention that the sensing means senses if the bypass means is bypassing the solid state switch means by sensing if there is a voltage pulse across the switch means during time between conduction of the solid state switch means in each half cycle.

It is still a further feature of the invention that the sensing means senses voltage across one of the solid state switch means and motor current.

It is an additional feature of the invention that the sensing means measures sensed voltage during time between conduction of the solid state switch means.

There is disclosed in accordance with another aspect of the invention a motor controller for a motor operated by an AC line voltage. The motor controller includes SCRs connectable between an AC line and a motor terminal for controlling application of AC line voltage to the motor. Contacts are connected in parallel with the SCRs for selectively bypassing the SCRs. A sensing circuit senses if the contacts are bypassing the SCRs.

There is disclosed in accordance with a further aspect of the invention a method of automatically sensing bypassing of a motor controller for a motor operated by an AC line voltage. The method comprises providing SCRs connectable between an AC line and a motor terminal for controlling application of AC line voltage to the motor; selectively bypassing the SCRs using contacts connected in parallel with the SCRs during a run mode of the motor; and automatically sensing if the contacts are bypassing the SCRs.

Further features and advantages of the invention will be readily apparent from the specification and from the drawing.

DETAILED DESCRIPTION OF THE INVENTION

Figure 1:
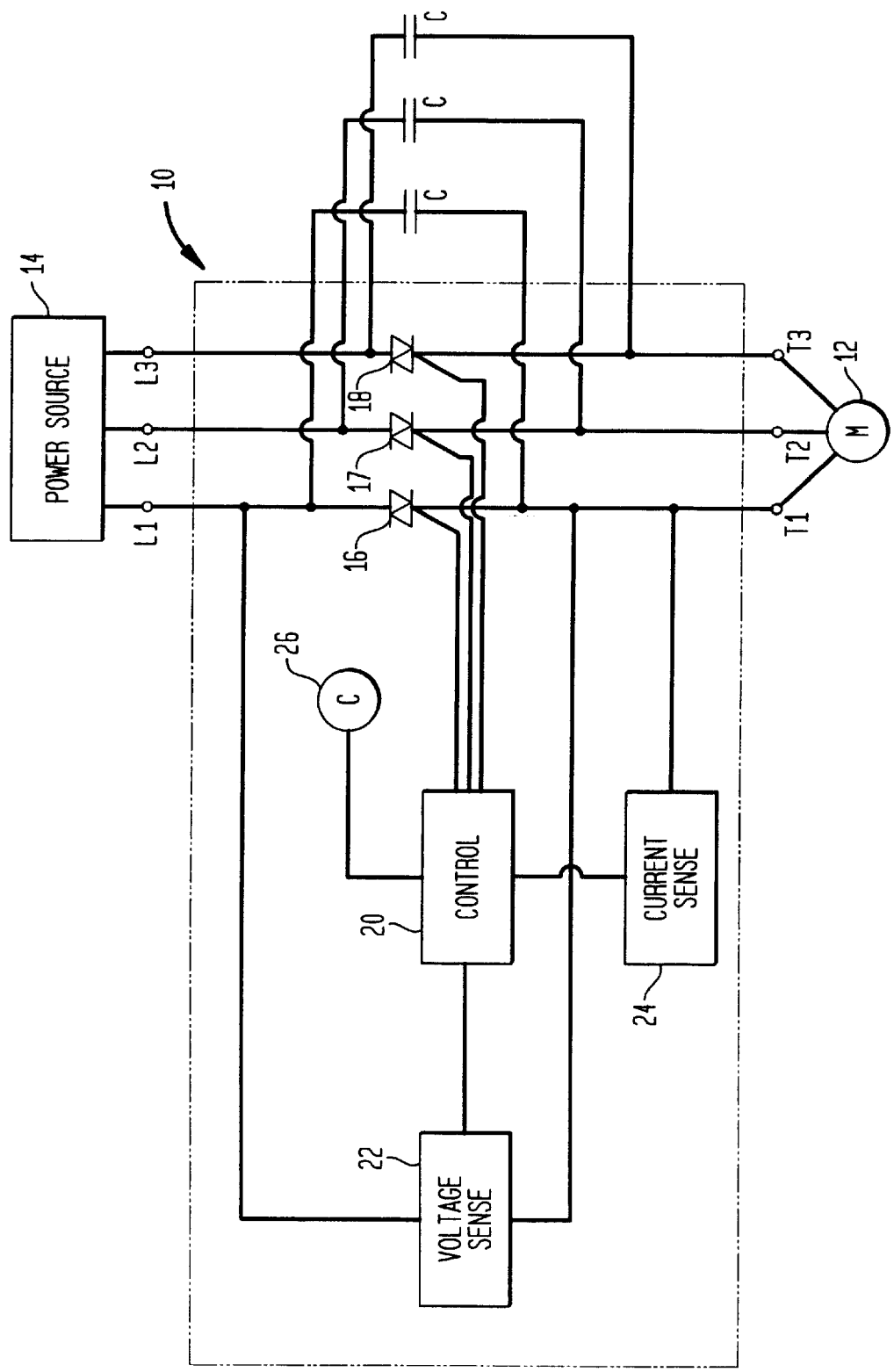
FIG. 1 is a block diagram of a motor system including a motor controller according to the invention.

Referring to FIG. 1, a motor controller 10 according to the invention controls operation of a motor 12 supplied by an AC line voltage developed by an AC power source 14. The power source 14 supplies line voltage, typically 200 to 690 volts AC, at terminals L1, L2 and L3. The motor controller 10 includes solid state switches in the form of two antiparallel silicon controlled rectifiers (SCRs), or single triacs 16, 17 and 18. The triacs 16–18 are connected between the respective line terminals L1, L2, and L3 and respective motor terminals, T1, T2 and T3. The triacs 16–18 control application of three phase AC line voltage 14 to the motor 12.

The invention described herein relates to protection of the SCRs or triacs 16–18 from arcing by automatically sensing if the triacs 16–18 are bypassed and if so, then adding a time delay before turn off. The controller 10 is illustrated for controlling a three phase system. However, the invention can be used in connection with motor controllers for controlling any number of phases, as will be apparent.

The triacs 16–18 are, in effect, bidirectional SCRs. A triac is a gate controller semiconductor device which permits current flow therethrough when the voltage on its gate exceeds a threshold value. Once the threshold has been exceeded, then current continues to flow through the triac until the current returns to zero, at which time conduction ceases until the gate threshold voltage is again exceeded. The triacs 16–18 are controlled by a control 20. The control 20 varies relative duration of on time and off time during each cycle of line voltage to control motor voltage at a reference level. The control 20 develops the switching signals for controlling the triacs 16–18. In the illustrated embodiment of the invention, the controller 10 comprises a solid state starter/controller which provides reduced voltage starting (RVSS). The control 20 initially operates the motor 12 at a reduced voltage and subsequently increases voltage until it reaches steady state operation. The basic switching scheme for controlling operation of the triacs 16–18 is described in, but not limited to, my U.S. Pat. No. 4,459,529, owned by the assignee of the present application, the specification of which is hereby incorporated by reference herein.

The controller 10 includes a voltage sensing circuit 22 for one of the phases. The voltage sensing circuit 22 may take any known form and is connected across the first triac 16 for sensing voltage between L1 and T1. If desired, then additional voltage sensing circuits could be used for sensing voltage across the second and third triacs 17 and 18. A current sensing circuit 24 is connected between the first triac 16 and the terminal T1 for determining the motor current for the first phase. Each sensing circuit 22 and 24 develops an analog signal proportional to the respective voltage and current which is input to the control 20.

The control 20 comprises an analog circuit or a micro controller or a microprocessor programmed in a conventional manner to control the triacs 16–18 using the sensed voltage and current signals. A programmed microprocessor is shown here. As discussed, under normal operation the control scheme for the triacs 16–18 is as described in U.S. Pat. No. 4,459,529 incorporated by reference herein.

To selectively bypass the triacs 16–18, the control 20 is operatively connected to a contactor coil 26. The coil 26 operates contacts C. Each of the contacts C is connected in parallel with one of the triacs. The contacts C are closed after the motor 12 has completed starting and is running at full speed. When the contacts C close, the current stops flowing through the triacs 16–18 and starts flowing through the contacts C. This is because the contacts C have lower impedance than the triacs. Although the coil 26 is illustrated as being driven by the control 20, the coil 26 could be driven by another source.

In accordance with the invention, the status of the contacts C bypassing the controller 10 can be sensed automatically. This eliminates the need for the equipment user or equipment manufacturer to remember to activate the above described delay when needed.

Figure 2:
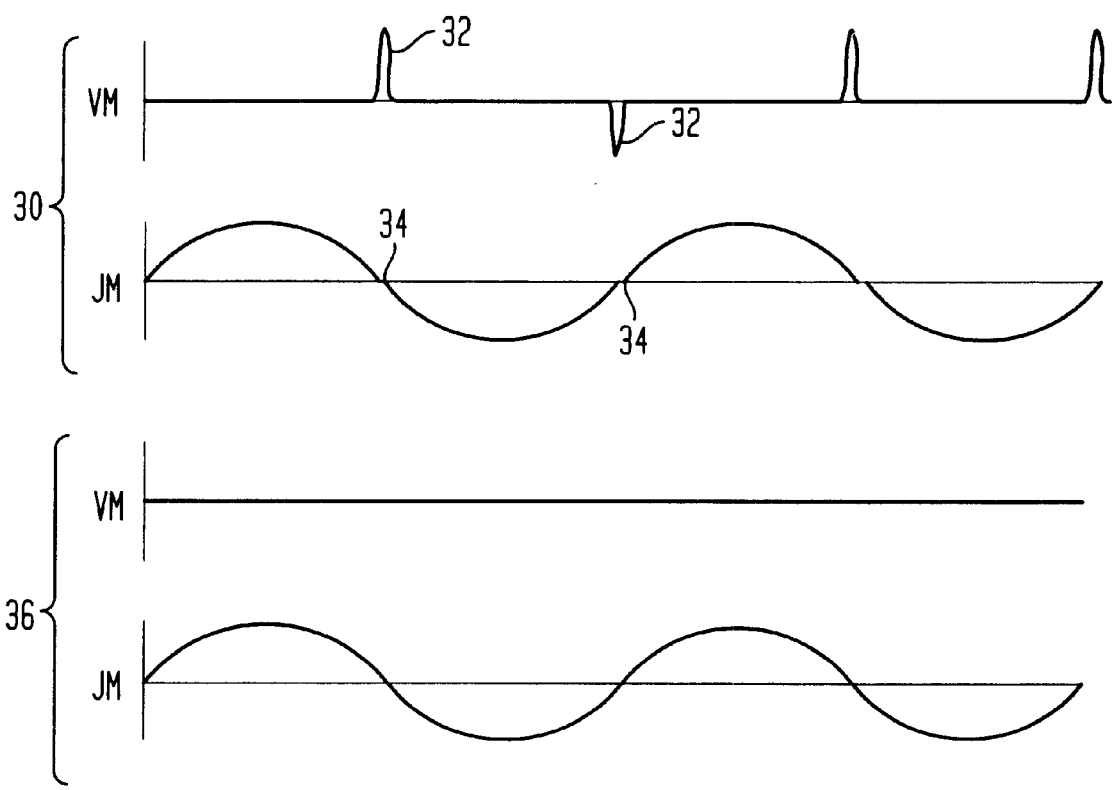
FIG. 2 is a series of curves illustrating operation of the motor system of FIG. 1 under bypass and no bypass conditions.

When the triacs 16–18 are running without a bypass, there is a short voltage pulse during the short time between current conduction of each of the SCRs in the pairs forming the triacs 16–18. This is illustrated with the curves 30 in FIG. 2. Particularly the voltage Vm from the voltage sensing circuit 22, see FIG. 1, is sensed to look for pulses 32 at the zero crossings 34 of the current Im from the current sensing circuit 24. When the triacs 16–18 are bypassed, there is no short voltage pulse since the contacts C carry current in both directions. This is illustrated with the curves 36 of FIG. 2.

By sensing the presence or absence of the voltage pulses 32, the controller 10 can automatically determine if the triacs 16–18 are bypassed. If the triacs 16–18 are bypassed, then the control 20 automatically adds the needed delay to the end of each running operation to prevent arcing from damaging the triacs 16–18.

Figure 3:
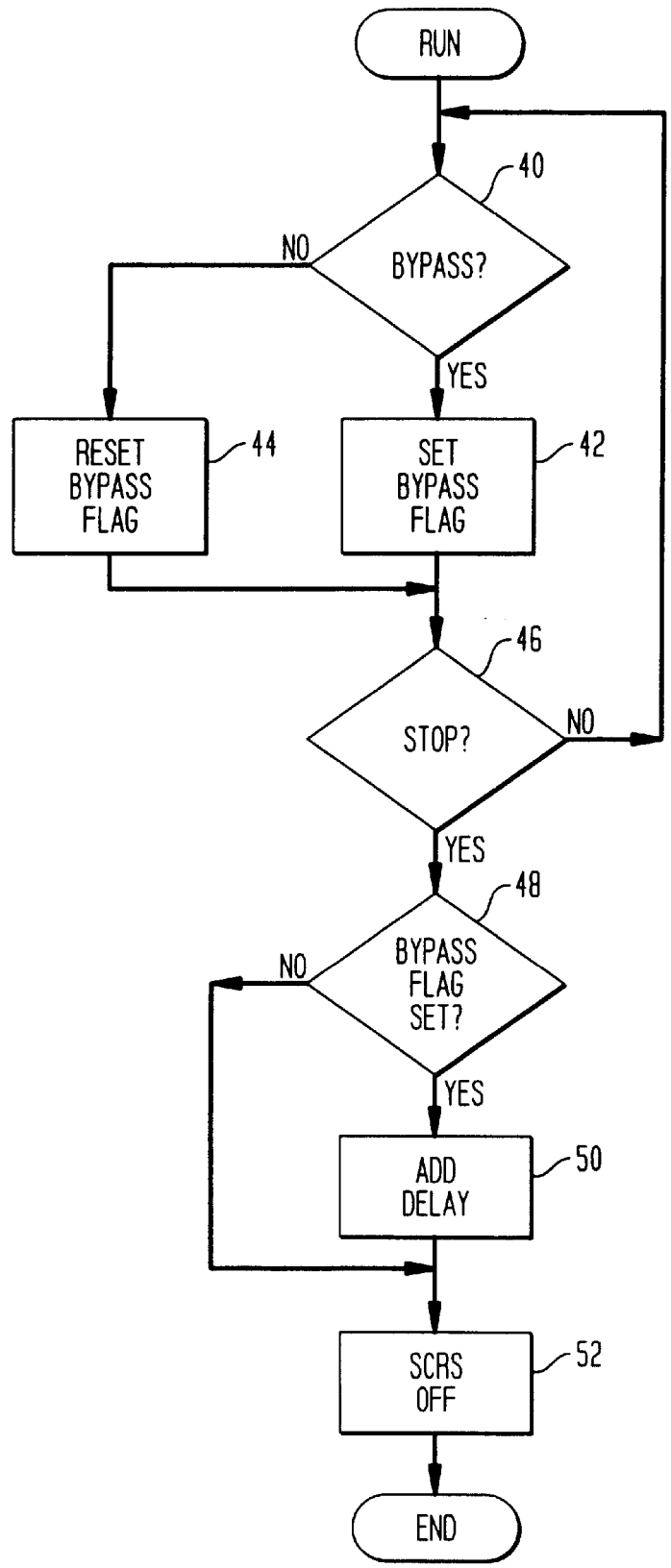
FIG. 3 is a flow diagram routine implemented in a control of FIG. 1

With reference to FIG. 3, a flow diagram illustrates operation of the control 20 during a run mode. As discussed above, the control 20 is also programmed to implement reduced voltage starting. The functions of reduced voltage starting and basic triac switching control is not illustrated in detail herein, as they are conventional in nature. The run mode begins at a block 40, which determines if the triacs 16–18 are bypassed, as discussed above. If so, then a bypass flag is set at a block 42. If not, then the bypass flag is reset at a block 44. From either block 42 or 44, a decision block 46 determines if the motor 12 is to be stopped for any reason. If not, then the run mode continues by returning to the block 40. If the motor 12 is to be stopped, then control proceeds to a stop mode.

The stop mode begins at a decision block 48 which determines if the bypass flag is set. If so, then delay is added at a block 50. At the end of the delay the triacs 16–18 are turned off at a block 52. The routine then ends. If the bypass flag is not sensed, at the decision block 48, then the triacs are turned off without a delay at the block 52.

Thus, in accordance with the invention there is provided a control which automatically senses bypassing of the solid state starter control switches and selectively adds a delay prior to turning the switches off to prevent damage to the switches.

I claim:

1. A motor controller for a motor operated by an AC line voltage comprising:

solid state switch means connectable between an AC line and a motor terminal for controlling application of AC line voltage to the motor, sensing means for automatically sensing if a voltage pulse occurs across the solid state switch means at a zero crossing of a current of the solid state switch means, the voltage pulse characterized by a deviation from, and return to, a reference voltage.

2. The motor controller of claim 1 further comprising control means connected to the sensing means and the solid state switch means for varying relative duration of on time and off time of the solid state switch means during each cycle of line voltage to control motor voltage at a reference level, the control means adding a time delay to a running operation prior to turning the solid state switch means off to stop the motor if the solid state switch means is bypassed.

3. The motor controller of claim 1 wherein the switch means comprises a silicon controlled rectifier.

4. The motor controller of claim 1 wherein the switch means comprises a triac.

5. The motor controller of claim 1 wherein the sensing means senses if the solid state switch means is bypassed.

6. The motor controller of claim 5 wherein the sensing means senses voltage across one of the solid state switch means and motor current.

7. The motor controller of claim 1 wherein the sensing means measures sensed voltage during time between conduction of the solid state switch means.

8. A motor controller for a motor operated by an AC line voltage comprising:
   SCRs connectable between an AC line and a motor terminal for controlling application of AC line voltage to the motor;
   a sensing circuit for sensing if a voltage pulse occurs across said SCRs between conduction of said SCRs, the voltage pulse characterized by a deviation from, and return to, a reference voltage.

9. The motor controller of claim 8 further comprising a control connected to the sensing circuit and the SCRs for varying relative duration of on time and off time of the SCRs during each cycle of line voltage to control motor voltage at a reference level, the control adding a time delay to a running operation prior to turning the SCRs off to stop the motor if the SCRs are bypassed.

10. The motor controller of claim 9 wherein the SCRs comprises triacs.

11. The motor controller of claim 8 wherein the sensing circuit senses if the SCRs are bypassed.

12. The motor controller of claim 11 wherein the sensing circuit senses voltage across one of the SCRs and motor current.

13. The motor controller of claim 8 wherein the sensing circuit measures sensed voltage during time between conduction of the SCRs.

14. A method of automatically sensing bypassing of a motor controller for a motor operated by an AC line voltage comprising:
   providing SCRs connectable between an AC line and a motor terminal for controlling application of AC line voltage to the motor;
   automatically sensing if a voltage pulse occurs across the SCRs between conduction of the SCRs, the voltage pulse characterized by a deviation from, and return to, a reference voltage.

15. The method of claim 14 further comprising providing a control for varying relative duration of on time and off time of the SCRs during each cycle of line voltage to control motor voltage at a reference level, the control adding a time delay to a running operation prior to turning the SCRs off to stop the motor if the SCRs are bypassed.

16. The method of claim 14 wherein the sensing step senses if the SCRs are bypassed.

17. The motor controller of claim 1 further comprising bypass means for selectively bypassing the solid state switch means.

18. The motor controller of claim 8 further comprising contacts for selectively bypassing the SCRs.

19. The method of claim 14 further comprising selectively bypassing the SCRs.

20. A motor controller for a motor operated by an AC line voltage comprising:
   a solid state switch connectable between an AC fine and a motor terminal, and adapted to, in an operative configuration, control application of AC line voltage to the motor;
   a circuit adapted to, in an operative configuration, transmit a signal if a voltage pulse occurs across said solid state switch, the voltage pulse characterized by a deviation from, and return to, a reference voltage.

21. A motor controller for a motor operated by an AC line voltage comprising:
   a solid slate switch connectable between an AC line and a motor terminal, and adapted to, in an operative configuration, control application of AC line voltage to the motor;
   a circuit adapted to, in an operative configuration, transmit a signal if a voltage pulse occurs across said solid state switch during time between a conduction of said solid state switch, the voltage pulse characterized by a deviation from, and return to, a reference voltage.

22. The motor controller of claim 21, wherein said circuit is adapted to, in an operative configuration, transmit said signal if the voltage pulse occurs across said solid state switch at a zero crossing of a current of said solid state switch.

23. A method of operating a motor controller for a motor operated by an AC line voltage comprising:
   providing a solid state switch connectable between an AC line and a motor terminal, and adapted to, in an operative configuration, control application of AC line voltage to the motor,
   automatically transmitting a signal if a voltage pulse occurs across the solid state switch, the voltage pulse characterized by a deviation from, and return to, a reference voltage.

24. The method of claim 23, wherein the signal is automatically transmitted if the voltage pulse occurs across the solid state switch at a zero crossing of a current of the solid state switch.

* * * * *